US012795055B2

(12) United States Patent
Krijnen et al.

(10) Patent No.: US 12,795,055 B2
(45) Date of Patent: Nov. 10, 2026

(54) PROJECTOR SYSTEM AND METHOD FOR PROJECTING IMAGES

(71) Applicant: Active Cues B.V., Utrecht (NL)

(72) Inventors: Rajiv Sanchez Krijnen, Driebergen (NL); Marijn Koetzier, Maarssen (NL); Frederik Wilhelmus Maria Soetens, Utrecht (NL)

(73) Assignee: ACTIVE CUES B.V., Utrecht (NL)

( * ) Notice: Subject to any disclaimer, the term of this patent is extended or adjusted under 35 U.S.C. 154(b) by 218 days.

(21) Appl. No.: 18/721,730

(22) PCT Filed: Dec. 22, 2022

(86) PCT No.: PCT/NL2022/050749
§ 371 (c)(1),
(2) Date: Jun. 19, 2024

(87) PCT Pub. No.: WO2023/121458
PCT Pub. Date: Jun. 29, 2023

(65) Prior Publication Data
US 2025/0063150 A1 Feb. 20, 2025

(30) Foreign Application Priority Data
Dec. 22, 2021 (NL) ..................................... 2030234

(51) Int. Cl.
*H04N 9/31* (2006.01)
*G06F 3/01* (2006.01)
(Continued)

(52) U.S. Cl.
CPC ........... *H04N 9/3194* (2013.01); *G06F 3/017* (2013.01); *G06F 3/0304* (2013.01);
(Continued)

(58) Field of Classification Search
CPC .. H04N 9/3141; H04N 9/3152; H04N 9/3155; H04N 9/3161; H04N 9/3164;
(Continued)

(56) References Cited

U.S. PATENT DOCUMENTS 8,218,003 B2 * 7/2012 Tan ........................ G09G 3/002 348/135
8,913,037 B1 12/2014 Liu et al.
(Continued)

OTHER PUBLICATIONS

Din et al. "Projector Calibration for Pattern Projection Systems", Journal of Applied Research and Technology, Feb. 2014, pp. 80-86, vol. 12, No. 1.
(Continued)

*Primary Examiner* — Sultan Chowdhury
(74) *Attorney, Agent, or Firm* — Steven M. Koehler; Westman, Champlin & Koehler, P.A.

(57) ABSTRACT

A projector system comprises a projector configured to form one or more images on a surface. A first and second camera records images of the surface. The second camera is sensitive to detection light from an object near and/or on the surface, and insensitive to the projected light. A data processing system is configured to provide calibration image data to the projector. The processing system then causes the projector to project light on the surface to form a projected version of the first calibration image on the surface. The processing system is configured to receive, from the first camera, image data representing a recorded image of the surface as recorded by the first camera while the first calibration image was being projected on the surface. Based on the image data, the processing system can determine the position of objects, detected by the second camera, in the projector reference frame.

14 Claims, 8 Drawing Sheets

(51) Int. Cl.
*G06F 3/03* (2006.01)
*G06F 3/042* (2006.01)
*H04N 17/00* (2006.01)

(52) U.S. Cl.
CPC ......... *G06F 3/0425* (2013.01); *H04N 9/3173* (2013.01); *H04N 9/3185* (2013.01); *H04N 17/002* (2013.01)

(58) Field of Classification Search
CPC .. H04N 9/3173; H04N 9/3185; H04N 9/3194; H04N 17/002; H04N 17/06; G03B 21/00; G03B 21/145; G03B 21/147; G03B 21/208; G03B 21/2053
See application file for complete search history.

(56) References Cited

U.S. PATENT DOCUMENTS

| | | | |
|---|---|---|---|
| 9,632,592 | B1 | 4/2017 | Liu et al. |
| 9,992,466 | B2 | 6/2018 | Pawlak et al. |
| 2016/0282961 | A1 | 9/2016 | Moussakhani |
| 2017/0308241 | A1 | 10/2017 | Short et al. |
| 2019/0155452 | A1 | 5/2019 | Short et al. |
| 2022/0012874 | A1 * | 1/2022 | Maier-Hein ............ G06T 7/254 |
| 2022/0383478 | A1 * | 12/2022 | Catbas .................. G06T 7/0002 |

OTHER PUBLICATIONS

Kamperman K., "Computer Vision: Frame Differencing", Apr. 24, 2010, 2 pages, retrieved from https://www.kasperkamperman.com/blog/computer-vision/computervision-framedifferencing/.
Martynov et al. "Projector Calibration by "Inverse Camera Calibration"", Heyden, A., Kahl, F. (eds) Image Analysis, SCIA 2011, Lecture Notes in Computer Science, 2011, pp. 536-544, vol. 6688.
Zhuang et al. "A Self-Calibration Approach to Extrinsic Parameter Estimation of Stereo Cameras", Robotics and Autonomous Systems, 1995, pp. 189-197, vol. 15, No. 3.
International Search Report and Written Opinion in corresponding International Application No. PCT/NL2022/050749 dated Mar. 29, 2023.
International Preliminary Report on Patentability in corresponding International Application No. PCT/NL2022/050749 dated Nov. 17, 2023.

* cited by examiner

PROJECTOR SYSTEM AND METHOD FOR PROJECTING IMAGES

CROSS-REFERENCE TO RELATED APPLICATION

This Application is a Section 371 National Stage Application of International Application No. PCT/NL2022/050749, filed Dec. 22, 2022 and published as WO 2023/121458 A1 on Jun. 29, 2023, in English.

FIELD OF THE INVENTION

This disclosure relates to a projector system and a method for projecting images

BACKGROUND

U.S. Pat. No. 9,992,466 B2 discloses a projection system that can function as an interactive white board system. The projection system comprises a position detection portion that can detect an operation on a screen based on a captured image obtained by capturing the screen. To this end, the system comprises an imaging portion (CCD or CMOS) that receives both infrared and visible light so that both infrared light and visible light can be taken in a captured image. Herein, the infrared signal originates from an infrared light emitting indicator and serves to detect the position of the indicator.

US 2016/0282961 A1 describes an interactive projector comprising two cameras, wherein the position of a pointing element may be detected based on a comparison of images captured by the two cameras. The two cameras may be independently calibrated using a calibration image projected by the projector and captured by each of the two cameras.

It is an aim of the present disclosure to provide for a projection system having improved detection.

SUMMARY

To that end a projector system is disclosed. The projector system comprises a projector for projecting light on a surface. The projected light is configured to form one or more images on the surface. The system also comprises a first camera for recording an image of the surface. The first camera is sensitive to projected light, e.g., visible light, that has reflected from the surface. The projector system also comprises a second camera for recording images of the surface. The second camera is sensitive to detection light, e.g., (near) infrared light, from an object near and/or on the surface and/or between the surface and the second camera. The object is for example a hand on the surface. The second camera is insensitive to the projected light. The projector, the first camera, and the second camera are arranged in known positions relative to each other, the second camera being arranged at a certain distance from the first camera. The projector system also comprises a data processing system configured to perform a number of steps. One step that the data processing is configured to perform is, in a preparatory stage, determining or receiving mapping information associating positions within an image as recorded by the second camera to respective positions within an image as recorded by the first camera, based on the relative positions of the projector, the first camera and the second camera. In a calibration stage, the data processing system is configured to perform a step of providing calibration image data to the projector. The calibration image data represent a first calibration image having a first image feature at a first position within the calibration image. The data processing system then causes the projector to project light on the surface to form a projected version of the first calibration image on the surface. Another step that the data processing system is configured to perform is a step of receiving, from the first camera, image data representing a recorded image of the surface as recorded by the first camera while the first calibration image was being projected on the surface. The first image feature is present in the recorded image at a second position within the recorded image. Another step that the data processing system is configured to perform is a step of determining that the first image feature in the recorded image corresponds to the first image feature in the calibration image thus determining a correspondence between the first position within the first calibration image and the second position within the recorded image. In an operation stage, the data processing system is configured to perform a step of providing image data to the projector, the image data representing one or more images, and causing the projector to project light on the surface to form a projected version of each of the one or more images on the surface. Another step that the data processing system is configured to perform is a step of receiving, from the second camera, detection image data representing a detection image as recorded by the second camera while the one or more images were being projected on the surface. The recorded detection image has an image of a particular object at a third position within the detection image. Another step that the data processing system is configured to perform is a step of, based on the determined correspondence, and based on mapping information associating positions within an image as recorded by the second camera to respective positions within an image as recorded by the first camera, and based on the third position, determining a position of the particular object within the one or more images represented by the image data.

The projector system allows to project images on a surface, such as a table, and enables physical objects, such as hands of persons, to "interact" with the formed images. In other words, the systems enables physical objects on the surface to influence which images are projected. In one concrete, specific example, the projector system projects light on a table which forms a movie of a ball rolling across the surface. The projector system can then detect when a person's hand on the table is at a position in which it touches the image of the rolling ball. As a response, the projector system can project light such that the ball rolls away from the hand, as if it bounces off the hand. To this end, the projector system is preferably able to, loosely speaking, map the reference frame of images provided as image data to the projector system, to the reference frame of images as recorded by a camera detecting the object, hereinafter referred to as the second camera or as the detection camera. As a side note, this may be performed by mapping both the reference frame of images provided as image data to the projector system and the reference frame of images as recorded by the camera detecting the object, both to yet another reference frame, for example to the reference frame of the physical surface or the reference frame of the first camera. The first camera may also be referred to as the calibration camera. Such mapping allows the projector system to, based on an image recorded by the second camera that depicts some object, determine at which position the object sits within the images provided as image data to the projector system. Then, the projector system, in particular the data processing system, can determine for example whether the object is at a position in which it touches some specific image feature, e.g. whether the object is at a position in which it touches the image of the ball.

The above-referred to mapping may be the result of a calibration procedure. Because the projector system may move to different positions, e.g. to different tables, the situation varies. To illustrate, the distance between the projector system and table may vary, the angle between the projector system and surface may vary, et cetera. Therefore, preferably, before the projector system is used in a particular configuration, it is first calibrated, e.g. in order to determine the mapping between the different reference frames.

As used herein, the second camera being insensitive to the projection light includes the system being configured such that the second camera does not receive the projection light, e.g., by use of a suitable filter positioned in front of the second camera.

As the detection camera is insensitive to the projection light (in particular also during the calibration stage), known calibration methods based on detection of a projected image by the detection camera may not be used. If the projector system would not comprise the first (calibration) camera, but only the second (detection) camera, such calibration may be performed by providing image data representing a calibration image to the projector system, wherein the calibration image comprises an image feature, let's say a dot, at a first position within the calibration image, and the projector projecting the calibration image on a surface. Then, a user can place a physical object which is detectable by the second camera on that projected dot. For example, the physical object may comprise an infrared emitter. The detection camera may then record an image which has the physical object at a second position within the recorded image. Then, the data processing system is able to determine that the second position within images as recorded by the detection camera corresponds to the first position within images as provided to the projector system.

However, because the claimed projector system comprises a first camera that is sensitive to projected light, and is configured to use the above described mapping information, there is no need to place physical objects on the surface during the calibration stage. The first camera can obtain images of the surface which shows the projected version of images on the surface. This allows the system to link positions within images as provided (as image data) to the projector system, to positions within images as recorded by the first camera. To illustrate, a calibration image may be provided comprising, again, a dot as image feature at a first position within the calibration image. The first camera then may record an image of the surface while the dot is projected on it and the recorded image may show the dot at a second position within the recorded image. Upon the system recognizing the dot in the recorded image, a link is established between the first position within images as provided to the projector system on one hand and the second position within images as recorded by the first camera. The mapping information may be understood to be indicative of link between positions within images as recorded by the first camera on one hand, and positions within images as recorded by the second camera. Hence, a link is established between positions as recorded by the second camera and images as provided to the projector system without requiring physical objects to be positioned on the surface.

In a typical use case, the preparatory stage is performed only once (e.g., after manufacturing) or seldomly (e.g., during periodic maintenance or when a mismatch is detected), the calibration stage is performed, e.g., each time the projector is moved or switched on, and the operation stage is used essentially continuously whilst the projector system is functioning. In other use cases, the calibration stage and the operation stage may both be operated essentially continuously, e.g., when the projector system and the surface are moving relative to each other.

An advantage of the claimed projector system and method is that the system can be calibrated with high precision without using physical markers on the surface, whilst using an (optimised) detection camera that is insensitive to the projected light. As a result, the projector system can in principle be positioned near any surface, e.g. near any table, and can perform an automatic calibration without requiring a user to position physical markers on the surface. It should be appreciated that the projected light is different from the detection light, for example in terms of wavelengths. This allows the second camera to detect the detection light without being distorted by projected light that has reflected from the surface and reaches the second camera as well.

Advantageously, the claimed projector system and method obviate the need to implement a single, special camera that can separately detect the reflected projected light and the detection light. If for example the reflected, projected light is visible light and the detection light is infrared (IR) light, then a special RGB+IR camera may be required having both RGB pixels and IR pixels, i.e. hardware pixels sensitive to infrared light. However, a drawback of RGB+IR cameras is that the spatial resolution with which they can capture infrared images is limited. After all, in an RGB+IR camera, the IR pixels are not closely positioned to each other because there are RGB pixels between the IR pixels. Further, RGB+IR cameras typically have, in front of each hardware pixel, an appropriate microfilter which causes the hardware pixel in question to receive R-light, G-light, B-light or IR-light. It will be clear that it will be very cumbersome, if not impossible, to change the microfilters in front of the IR pixels. However, preferably, the filters in front of the IR-pixels completely block light originating from the projector such that this light does not distort the detection of objects. Unfortunately, typically, in RGB+IR cameras currently on the market, the filters in front of the IR pixels do pass, at least to some extent, visible light. Hence, such off-the-shelf RGB+IR cameras are less suitable for the projector system.

Hence, an RGB+IR camera provides little flexibility, indeed almost no flexibility, in terms of controlling which specific wavelength is detected by the IR pixels. In contrast, with the projector system and method as claimed, whatever light, with whatever wavelengths, is used as detection light, the second camera can be made sensitive to specifically this wavelength in a simple manner, for example by simply positioning an appropriate filter in front of an imaging surface of the second camera, which filter passes light in a desired wavelength range.

Thus, the first and second cameras are physically distinct cameras. Therefore, they are necessarily positioned at a certain distance from each other, e.g., at least 0.5 cm apart. More typically, the distance between the first and second camera will be considerably larger, e.g., at least 1 cm, at least 5 cm, or even at least 10 cm.

Another example of a special camera that can separately detect the reflected projected light and the detection light is a camera having a controllable, e.g. movable, filter that can move between two positions, one position wherein it sits before the imaging surface and one position wherein it does not, as seems described in U.S. Pat. No. 9,992,466 B2. However, such filter is undesired, because it may wear. Further, the movements of such filter should be accurately timed, which requires complex control systems as described in U.S. Pat. No. 9,992,466 B2. This is particularly true when frequent (e.g., continuous) calibration is desired.

The projected light may have wavelengths in a first wavelength range, whereas the detection light may have wavelengths in a second wavelength range, that is different from the first wavelength range. Preferably, the first and second wavelength range do not overlap. The detection light may be infrared (IR) light. Infrared light may be light having a wavelength between 750 nm and 2500 nm, preferably between 750 nm and 1400 nm, more preferably between 800 nm and 1400 nm.

Preferably, the projector system is a movable system. The projector system may comprise a base with wheels underneath, so that the projector system can be easily moved from table to table. Typically, each time the projector system has been moved, it should be recalibrated; thus, the steps of the calibration stage may be performed leading to a new correspondence between positions within the one or more calibration images and the corresponding positions within the one or more recorded images.

As referred to herein, a position within an image may refer to a position of a pixel or of a group of pixels within the image. Such position may for a two-dimensional image be indicated by coordinates (x,y) wherein x indicates a measure of width and y a measure of height with respect to some origin position. It should be appreciated that in principle, because the setup during projection does not change, it can be assumed that the reference frame of the first camera does not change and that the reference frame of the second camera does not change and that the reference frame of images provided to the projector does not change. Thus, the calibration may be performed based on only few images as recorded by the first and second camera and based on only few images as provided as image data to the projector, yet may be valid for further recorded and provided images in that particular set-up as well.

An image feature as referred to herein may be any feature of an image which the data processing system can recognize and localize within an image. For example, the image feature may be crossing of two or more lines, a dot, et cetera. Of course, a calibration may comprise several image features that all can be used during the calibration. To illustrate, the calibration image may be an image of a grid. Then, each crossing in the grid may be treated as an image feature for calibration purposes.

It should be appreciated that the first and second camera may be understood to be suitable for recording images of the surface in the sense that the surface is in the field of view of the first respectively second camera. It does not necessarily mean that the first and second camera are able to record images in which the surface is distinguishable.

Preferably, the first and second camera are fixed with respect to each other, i.e. are unable to move with respect to each other. Preferably, the first camera, second camera and projector have a fixed position and orientation with respect to each other or, in other words, have fixed extrinsic parameters with respect to each other.

The mapping information may be embodied as a transformation matrix which maps the reference frame of the first camera to the reference frame of the second camera, and/or vice versa. Such transformation matrix can be used to map any position within images as recorded by the first camera to position within images as recorded by the second camera, and/or vice versa.

The determined correspondence(s) between positions within the calibration image and positions within the image recorded by the first camera may be used by the data processing system for determining a second transformation matrix, e.g., $M_1$ below, which can be used for mapping any position within images as recorded by the first camera to a position within images as provided to the projector in the form of image data, or, in other words, which can be used for mapping any position within the first camera reference frame to a position within the projector reference frame.

In particular, the data processing system may be configured to perform a step of determining, based on one or more determined correspondences between positions in the first camera reference frame and positions in the projector reference frame, a transformation matrix $M_1$, which satisfies $$\begin{bmatrix} x_i \\ y_i \\ 1 \end{bmatrix} \sim M_1 \begin{bmatrix} x_i' \\ y_i' \\ 1 \end{bmatrix}$$

This matrix equation indicates a mapping from positions $$(x_i', y_i')$$

within images as recorded by the first camera, i.e., positions within the first camera reference frame, to positions $(x_i, y_i)$ within images as provided to the projector, i.e., to positions within the projector reference frame, by means of the 3×3 transformation matrix $M_1$.

The below matrix equation indicates a mapping from positions $$(x_i'', y_i'')$$

within images as recorded by the second camera, i.e., positions within the second camera reference frame, to positions $$(x_i', y_i')$$

within images as recorded by the first camera, i.e., to positions within the first camera reference frame, by means of the 3×3 transformation matrix $M_2$. Note that $M_2$ may be understood as an example of mapping information referred to in this disclosure.

$$\begin{bmatrix} x_i' \\ y_i' \\ 1 \end{bmatrix} \sim M_2 \begin{bmatrix} x_i'' \\ y_i'' \\ 1 \end{bmatrix}$$

The above transformation matrices $M_1$, $M_2$ allow to determine a transformation matrix M, which can directly map positions within the second camera reference frame to positions within the projector reference frame in accordance with:

$$\begin{bmatrix} x_i \\ y_i \\ 1 \end{bmatrix} \sim M \begin{bmatrix} x_i'' \\ y_i'' \\ 1 \end{bmatrix},$$

wherein $M=M_1M_2$, as per the equations presented above.

Thus, correspondences may be determined between a first 3D coordinate system associated with the first camera $C_1$, a second 3D coordinate system associated with the second camera $C_2$, and a third 3D coordinate system associated with the projector P. The may be used to determine correspondences between a first 2D image space associated with the first camera $C_1$, a second 2D image space associated with the second camera $C_2$, and a third 2D image space associated with the projector P For example, a projector P may project an image with points of interest (e.g., a calibration image) on a surface. Using known image processing techniques, the points of interest may be detected from an image captured by the first camera $C_1$ of the projected image in the first 2D image space associated with the first camera $C_1$. Using first intrinsic calibration parameters of the first camera $C_1$, an inverse projection may be applied to the detected points to create a ray $R_1$ that intersects the eye of the camera and the pixel in the first 3D coordinate system associated with the first camera $C_1$. The first intrinsic calibration parameters of the first camera $C_1$ may, e.g., be provided by the manufacturer or determined experimentally.

Using intrinsic parameters of the projector P, inverse projection may also be applied to the points of interest in the third 3D coordinate system associated with the projector P, resulting in a projector ray $R_P$. The projector ray $R_P$ may be transformed from the second 3D coordinate space associated with the projector P to the first coordinate space associated with the first camera $C_1$ using first extrinsic stereo calibration parameters $P_{P>1}$. The first extrinsic stereo calibration parameters $P_{P->1}$ may be determined, for example, based on the relative position of the projector P and the first camera $C_1$, or experimentally using a controlled set-up.

For each of the points of interest, 3D coordinates in the first 3D coordinate space associated with the first camera $C_1$ may be estimated by applying triangulation to each pair of rays ($R_1$, $R_P$) obtained from the same point of interest. This results in a transformation between points in the first and second 3D coordinate systems, e.g., a transformation matrix $M_1$ as described above.

The 3D coordinates from the first 3D coordinate space associated with camera $C_1$ may be transformed to the second 3D coordinate space associated with the second camera $C_2$, using second extrinsic stereo calibration parameters $P_{1->2}$. The second extrinsic stereo calibration parameters $P_{1->2}$ may be determined, for example, based on the relative position of the first camera $C_1$ and the second camera $C_2$, or experimentally using a controlled set-up.

Then, the points from the second 3D coordinate space associated with the second camera $C_2$ may be projected to the second 2D image space associated with the second camera $C_2$ using second intrinsic calibration parameters associated with the second camera $C_2$. The second intrinsic calibration parameters of the second camera $C_2$ may, e.g., be provided by the manufacturer or determined experimentally.

Using pairs of image points in the third 2D image space associated with projector P and in the second 2D image space associated with the second camera $C_2$, a homography matrix can be estimated that transforms the view from the second camera $C_2$ into the view of the projector P. With the estimated homography, the calibration problem is solved.

Intrinsic parameters are well-known in the field of camera calibration and can be obtained using methods known in the art. Examples of such intrinsic parameters are focal length and lens distortion. Extrinsic parameters of a camera may be understood to define the position and orientation of the camera with respect to a 3D world frame of reference or, for example, to a frame of reference of another camera.

Determining the intrinsic and extrinsic parameters of the first and second camera may be performed using methods well-known in the art, for example as described in H. Zhuang, 'A self-calibration approach to extrinsic parameter estimation of stereo cameras', *Robotics and Autonomous Systems* 15:3 (1995) 189-197, which is incorporated herein by reference.

Preferably, the data processing system comprises a storage medium that has stored the mapping information. The method may comprise storing the mapping information.

The projected light is preferably configured to form a plurality of images in succession, i.e. configured to from a movie on the surface. As explained above, persons can interact with elements of the movies. Thus, the projector system is highly suitable for playing games.

The first camera may comprise a first filter that passes the reflected, projected light and blocks other light, such that the images recorded by the first camera are based substantially only on reflected, projected light. The second camera may comprise a second filter that passes the detection light, yet blocks other light, such that the detection images recorded by the second camera are based substantially only on the detection light. The filters can be chosen with appropriate cut-off wavelengths.

In an embodiment, the first calibration image has a second image feature at a fourth position within the first calibration image different from the first position. In such embodiment, the second image feature is present in the recorded image at a fifth position within the recorded image. In this embodiment, the data processing system is configured to perform steps of determining that the second image feature in the recorded image corresponds to the second image feature in the calibration image thus determining a second correspondence between the fourth position within the first calibration image and the fifth position within the recorded image, and determining the position of the particular object within the one or more images represented by the image data based on the determined correspondence, the determined second correspondence, the third position, and the mapping information.

In this embodiment, several image features are used for the calibration, for example at least three non-collinear image features. It should be appreciated that both the first correspondence (between the first position within the first calibration image and the second position within the recorded image) and the second correspondence (between the fourth position within the first calibration image and the fifth position within the recorded image) can be used in determining a mapping from reference frame of the projector, i.e. the reference frame of images provided as image data to the projector, to the reference frame of the first camera. In principle, the more image features are used, the more accurate this mapping can be determined.

Of course, by determining the position of the particular object within the one or more images represented by the image data based on such mapping, the position is determined based on all correspondences used to determine the mapping in the first place.

In an embodiment, the calibration image data represent a second calibration image having a second image feature at a fourth position within the second calibration image, different from the first position within the first calibration image. In such embodiment, the data processing system is configured to perform steps of causing the projector to project light on the surface to form a projected version of the second calibration image on the surface; and receiving, from the first camera, second image data representing a second recorded image of the surface as recorded by the first camera while the second calibration image was being projected on the surface, wherein the second image feature is present in the second recorded image at a fifth position within the second recorded image, and determining that the second image feature in the second recorded image corresponds to the second image feature in the second calibration image thus determining a second correspondence between the fourth position within the second calibration image and the fifth position within the second recorded image, and determining the position of the particular object within the one or more images represented by the image data based on the determined correspondence, the determined second correspondence and the mapping information.

In this embodiment, also more image features are used, however, in different calibration images. As explained above, the reference frame of the projector does not change. Hence, it is no problem that image features of for example successive images (in time) are used for the calibration. In light of this, it should be appreciated that when in this disclosure reference is made to a calibration image having several image features, it may refer to several calibration images wherein each calibration image of the several calibration images has one or more of the image features used for calibration.

In an embodiment, the data processing system is further configured to perform steps of based on the determined position of the particular object within the one or more images represented by the image data, determining further image data representing further one or more images, and providing the further image data to the projector and causing the projector to project light on the surface to form a projected version of each of the one or more further images.

The one or more further images may have image features that are moving due to the object having "touched" those image features. Thus, this embodiment enables to respond to the movements and positions of, for example, hands on the table.

In an embodiment, the data processing system is configured to perform a step of determining the mapping information, this step comprising measuring a position and orientation of the surface relative to the first and/or second camera.

Preferably, the data processing system has obtained the intrinsic parameters of the first camera and the intrinsic parameters of the second camera. Preferably, the data processing system has also obtained information indicating the position and orientation of the first camera relative to the second camera. This latter information may also be referred to as the extrinsic parameters of the first camera with respect to the second camera. The data processing system can then namely, based on the determined position and orientation of the surface relative to the first and second camera, and based on the intrinsic and extrinsic parameters, link any position within an image (of the surface) as recorded by the first camera to a position on the surface and link any position within an image (of the surface) as recorded by the second camera to a position on the surface. In this sense, the intrinsic parameters of the first camera, the intrinsic parameters of the second camera, the extrinsic parameters of the first camera with respect to the second camera and information indicating the position and orientation of the surface relative to the first and second camera may be understood to be indicative of a link between positions in images as recorded by the first camera and respective positions in images as recorded by the second camera and therefore may be understood as mapping information referred to herein. It should be appreciated that it is not necessary to explicitly determine the homography matrix $H_1$ as per above is determined. To illustrate, the data processing system may be configured to use these parameters for a direct mapping from second camera reference frame to projector reference frame in order to determine the position of an object within the projector reference frame. Then still, however, this direct mapping may be understood to be performed based on mapping information.

The position and orientation of the surface may be input by a user into the data processing system via a user interface. In such case, a user may first measure the exact position and orientation of the surface with respect to the first and second camera and then input the measurements into the data processing system. Further, the information indicating the relative positions and orientations of the first and second camera with respect to each other may be prestored by the data processing system as well. The intrinsic parameters of the first camera, second camera and projector may also be prestored by the data processing system.

In an embodiment, the step of determining the position and orientation of the surface relative to the first and/or second camera is performed based on the determined correspondence.

Preferably, the data processing system has obtained the intrinsic parameters of the projector and information indicating the position and orientation of the projector relative to the first and second camera. The latter information may also be referred to as the extrinsic parameters of the projector with respect to the first and second camera. The intrinsic and extrinsic parameters of the projector may for example be determined in accordance with the method as described in I. Din et al., 'Projector Calibration for Pattern Projection Systems', *Journal of Applied Research and Technology*, Volume 12, Issue 1 (February 2014), pages 80-86, and/or in accordance with the method as described in I. Martynov, J. K. Kamarainen, and L. Lensu, 'Projector Calibration by "Inverse Camera Calibration"', in: A. Heyden, F. Kahl (eds) *Image Analysis. SCIA* 2011. *Lecture Notes in Computer Science, vol* 6688. (2011 Springer, Berlin, Heidelberg), available at https://doi.org/10.1007/978-3-21227-7 50; both of which are incorporated herein by reference.

The data processing system can, based on the intrinsic parameters of the first camera and the intrinsic parameters of the projector and the extrinsic parameters of the projector with respect to the first camera, map any given point in the 3D world reference frame (which point is of course in the field of view of the first camera and the projector) both to a position within an image as recorded by the first camera and to a position within an image as provided to the projector (provided to the projector as image data for causing the projector to project a projected version of the image on the surface). Given the position of the image feature in the first camera reference frame and the corresponding position of that same feature in the projector reference frame, it is possible to determine the position of that feature in the 3D world reference frame, using a well-known process called triangulation. If this is performed for three or more image features having different, non-collinear positions, then the position and orientation of the surface can be determined.

Therefore, preferably, the first calibration image has at least three image features at three different, non-collinear positions, because this allows the data processing system to determine the position and orientation of the surface, which may be understood as determining the mapping information as explained above.

The data processing system may thus be configured to perform steps of providing calibration image data to the projector, the calibration image data representing a calibration image having a first image feature at a position A within the calibration image and a second image feature at a position B within the calibration image and a third image feature at a position C within the calibration image, wherein A, B and C denote different, non-collinear positions, and causing the projector to project light on the surface to form a projected version of the calibration image on the surface, and receiving, from the first camera, image data representing a recorded image of the surface as recorded by the first camera while the calibration image was being projected on the surface, wherein the first image feature is present in the recorded image at a position D within the recorded image, the second image feature is present in the recorded image at a position E within the recorded image and the third image feature is present in the recorded image at a position F within the recorded image, wherein D, E, F indicate different positions, and determining that the first image feature in the recorded image corresponds to the first image feature in the calibration image thus determining a first correspondence between the position A within the first calibration image and the position D within the recorded image, and determining that the second image feature in the recorded image corresponds to the second image feature in the calibration image thus determining a second correspondence between the position B within the first calibration image and the position E within the recorded image, and determining that the third image feature in the recorded image corresponds to the third image feature in the calibration image thus determining a third correspondence between the position C within the first calibration image and the position F within the recorded image, and based on the determined first, second and third correspondences, determining a position and orientation of the surface relative to the first and/or second camera, preferably based on intrinsic parameters of the first camera and based on the intrinsic parameters of the projector and based on the relative positions and orientations of the first camera and projector relative to each other, herewith determining mapping information associating positions within an image as recorded by the second camera to respective positions within an image as recorded by the first camera, and providing image data to the projector, the image data representing one or more images, and causing the projector to project light on the surface to form a projected version of each of the one or more images on the surface, and receiving, from the second camera, detection image data representing a detection image as recorded by the second camera while the one or more images were being projected on the surface, the recorded detection image having an image of a particular object at a third position within the detection image, and based on the mapping information (and thus based on the three determined correspondences), and based on the third position, determining a position of the particular object within the one or more images represented by the image data.

Of course, it is not required that one calibration image comprises all three image features. Different calibration images may be used wherein each calibration image comprises an image feature at a different position. Hence, a calibration image that has several image feature may in this disclosure also refer to multiple calibration image, wherein each calibration image has one or more image features that are used in the calibration.

In an embodiment, the detection image data represent a plurality of detection images as recorded by the second camera. In such embodiment, the data processing system is configured to perform steps of determining a difference between at least wo detection images out of the plurality of detection images, and based on the determined difference, determining that the particular object in the recorded detection image sits at the third position within the detection image.

In this embodiment, it may be understood as that the position of the object within the detection images is performed based on so-called frame differencing. This is a technique known in the art for detecting movement. It should be appreciated that the projector system described herein, with its two cameras, can easily be configured such that the detection camera is not at all sensitive to projected light. This is for example more difficult in case RGB+IR cameras are used, Typically, the IR pixels in such cameras are, to some extent, sensitive to R-light as well. The ability to really make the second camera insensible to projection light is especially advantageous in the context of frame differencing. It is readily understood that if frame differencing is applied for detection of objects in images as recorded by the second camera, then it will become very difficult, if not impossible, if the camera is sensitive to the, in case of movies being projected, fast changing projection light. The fast changing projection light will then cause significant differences between successive detection images, rendering it almost impossible to detect a moving hand, for example. Such frame differencing technique is for example described at https://www.kasperkamperman.com/blog/computer-vision/computervision-framedifferencing/.

In an embodiment, the first camera comprises a first imaging plane for receiving the projected light that has reflected from the surface for recording images of the surface and the second camera comprises a second imaging plane for receiving the detection light for recording images of the surface, wherein the first imaging plane and second imaging plane are non-overlapping.

Thus, the first and second camera may be separate cameras. The image planes referred to may be understood to be hardware planes. The image plane may be the surface onto which light is focused for recording an image. Each image plane may comprise a set of adjacent pixels. Non-overlapping planes may be understood as that the set of adjacent pixels of the first image plane are present in a first area and the set of adjacent pixels of the second image plane are present in a second area, wherein the first and second area do not overlap.

In an embodiment, the projector system comprises a detection light source for emitting light towards the surface, such that the detection light reflects from the particular object onto the second camera. This embodiment obviates the need for objects to generate detection autonomously for them to be detectable. However, in one example, the to be detected objects can generate detection light autonomously, in which case, the detection light source is not required.

One aspect of this disclosure relates to a method for projecting one or more images on a surface using a projector system as disclosed herein. The method is preferably a computer-implemented method and comprises in a preparatory stage:

determining or receiving mapping information associating positions within an image as recorded by the second camera to respective positions within an image as recorded by the first camera, based on the relative positions of the projector, the first camera and the second camera; in a calibration stage:

providing calibration image data to the projector, the calibration image data representing a first calibration image having a first image feature at a first position within the calibration image, and causing the projector to project light on the surface to form a projected version of the first calibration image on the surface, receiving, from the first camera, image data representing a recorded image of the surface as recorded by the first camera while the first calibration image was being projected on the surface, wherein the first image feature is present in the recorded image at a second position within the recorded image, and determining that the first image feature in the recorded image corresponds to the first image feature in the calibration image thus determining a correspondence between the first position within the first calibration image and the second position within the recorded image, and in an operation stage:

providing image data to the projector, the image data representing one or more images, and causing the projector to project light on the surface to form a projected version of each of the one or more images on the surface, receiving, from the second camera, detection image data representing a detection image as recorded by the second camera while the one or more images were being projected on the surface, the recorded detection image having an image of a particular object at a third position within the detection image, and determining a position of the particular object within the one or more images represented by the image data, based on the determined correspondence, the mapping information, and the third position.

The method for projecting images as disclosed herein may comprise any of the method steps as performed by the data processing system described herein.

In an embodiment, the method comprises based on the determined position of the particular object within the one or more images represented by the image data, determining further image data representing further one or more images, and providing the further image data to the projector and causing the projector to project light on the surface to form a projected version of each of the one or more further images.

In an embodiment, the detection image data represent a plurality of detection images as recorded by the second camera and the method comprises determining a difference between at least wo detection images out of the plurality of detection images, and based on the determined difference, determining that the particular object in the recorded detection image sits at the third position within the detection image.

One aspect of this disclosure relates to a data processing system that is configured to perform any of the methods disclosed herein.

One aspect of this disclosure relates to a computer program comprising instructions which, when the program is executed by a computer, cause the computer to carry out any of the methods described herein. In particular, the computer program may comprise instruction that cause the projector system described herein to perform any of the methods described herein.

One aspect of this disclosure relates to a computer-readable data carrier having stored thereon any of the computer programs described herein. The computer-readable data carrier is preferably non-transitory and may be a storage medium or a signal, for example.

One aspect of this disclosure relates to a computer comprising a a computer readable storage medium having computer readable program code embodied therewith, and a processor, preferably a microprocessor, coupled to the computer readable storage medium, wherein responsive to executing the computer readable program code, the processor is configured to perform any of the methods described herein.

One aspect of this disclosure relates to a computer program or suite of computer programs comprising at least one software code portion or a computer program product storing at least one software code portion, the software code portion, when run on a computer system, being configured for executing any of the methods described herein.

One aspect of this disclosure relates to a non-transitory computer-readable storage medium storing at least one software code portion, the software code portion, when executed or processed by a computer, is configured to perform any of the methods described herein.

As will be appreciated by one skilled in the art, aspects of the present invention may be embodied as a system, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

Moreover, a computer program for carrying out the methods described herein, as well as a non-transitory computer readable storage-medium storing the computer program are provided. A computer program may, for example, be downloaded (updated) to the existing systems (e.g. to the existing data processing system of the projector system or be stored upon manufacturing of these systems.

Elements and aspects discussed for or in relation with a particular embodiment may be suitably combined with elements and aspects of other embodiments, unless explicitly stated otherwise. Embodiments of the present invention will be further illustrated with reference to the attached drawings, which schematically will show embodiments according to the invention. It will be understood that the present invention is not in any way restricted to these specific embodiments.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

In the figures, identical reference numbers indicate identical or similar elements.

Figure 1:
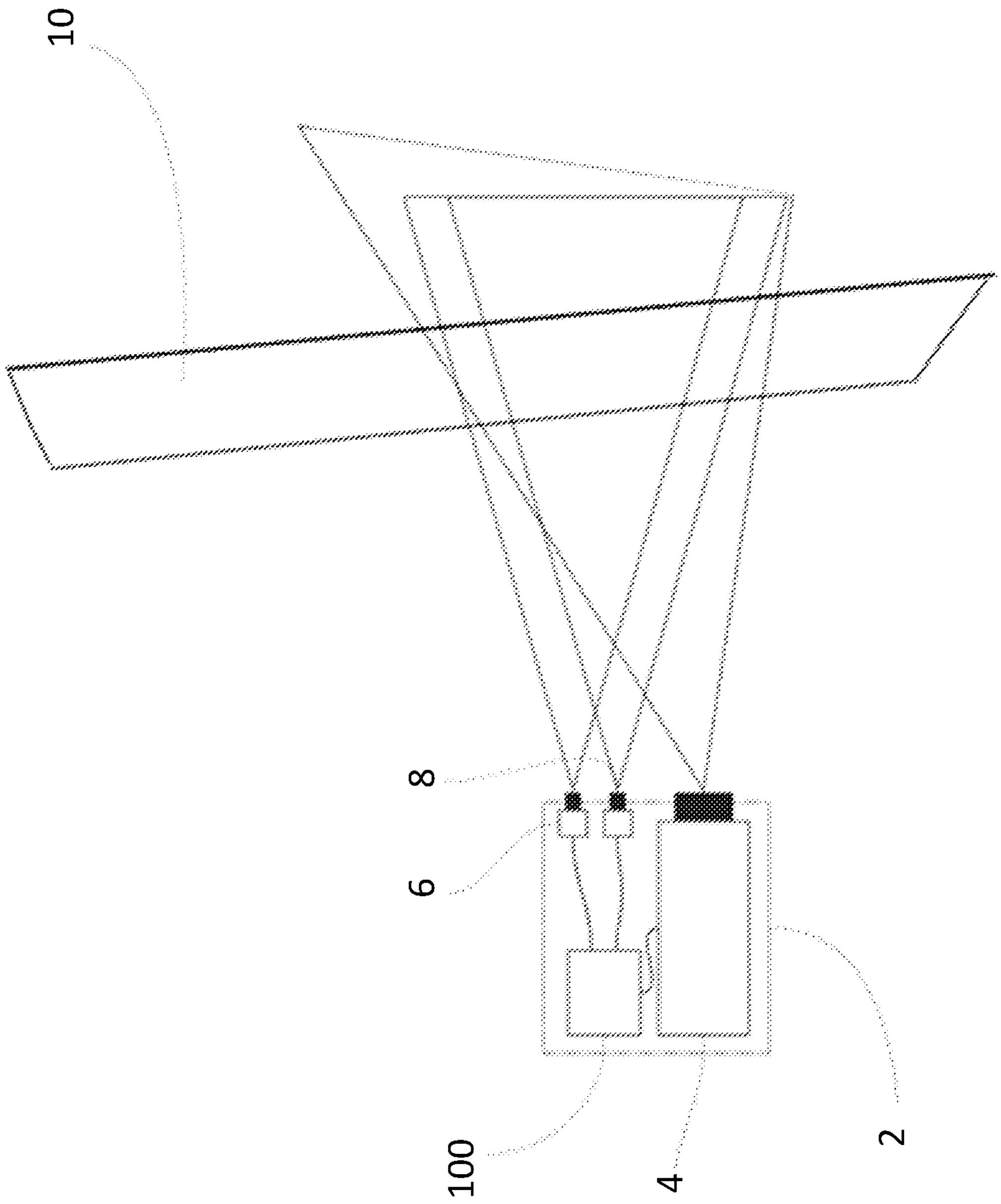
FIG. 1 schematically illustrates an embodiment of the projector system.

FIG. 1 schematically illustrates an embodiment of the projector system disclosed herein. Herein, a projector 4 is configured to project light on surface 10. Surface 10 may be any surface onto which an image can be projected. In a preferred embodiment, the surface 10 is a surface of a table, however, the surface could also be a floor, wall or ceiling, for example. The light from the projector 4 forms one or more images on the surface. Preferably, the projector forms moving images, i.e. projects movies, on the surface 10. The projector system and methods disclosed herein are particularly advantageous in that they allow persons to interact with the images, or with image features thereof. These persons for example sit at a table onto which the images are projected.

The projector system comprises first camera 6 for recording an image of the surface 10. The first camera is sensitive to light from the projector 4 that has reflected from the surface 10. Since the projector is typically configured to project visible light, also referred to as RGB light, the first camera 6 is typically an RGB-camera. For clarity reasons the first camera is sometimes referred to in this description and in the drawings as the RGB camera. However, it should be appreciated that the first camera may be any type of camera as long as it is sensitive to light from the projector 4.

The projector system 2 comprises a second camera 8 for recording images of the surface 10. The second camera 8 is sensitive to detection light from an object near and/or on the surface 10 and/or between the surface and the second camera, such as a person's hand on the surface. The second camera may be understood to be used for detecting objects near the surface 10 and is therefore sometimes referred to in this disclosure as the detection camera. The detection light is preferably light of a different wavelength than the light that is projected by the projector 4. In this way, the projection light that reflects from the surface 10 does not distort, or at least distorts to a lesser extent, the detection of the objects. In a preferred embodiment, the detection light is infrared light.

Preferably, the first and second camera are separate cameras. Preferably, the first and second camera each have an imaging plane for recording images, wherein the imaging plane of the first camera and the imaging plane of the second camera do not overlap each other. In such case, each camera may have a lens system for focusing light on its imaging plane.

The projector system 2 further comprises a data processing system 100 that is configured to perform a number of steps. The data processing system 100 may be understood to process and/or analyse the images as recorded by the first and second camera and control the operation of the projector 4 based on such analysis.

Figure 2:
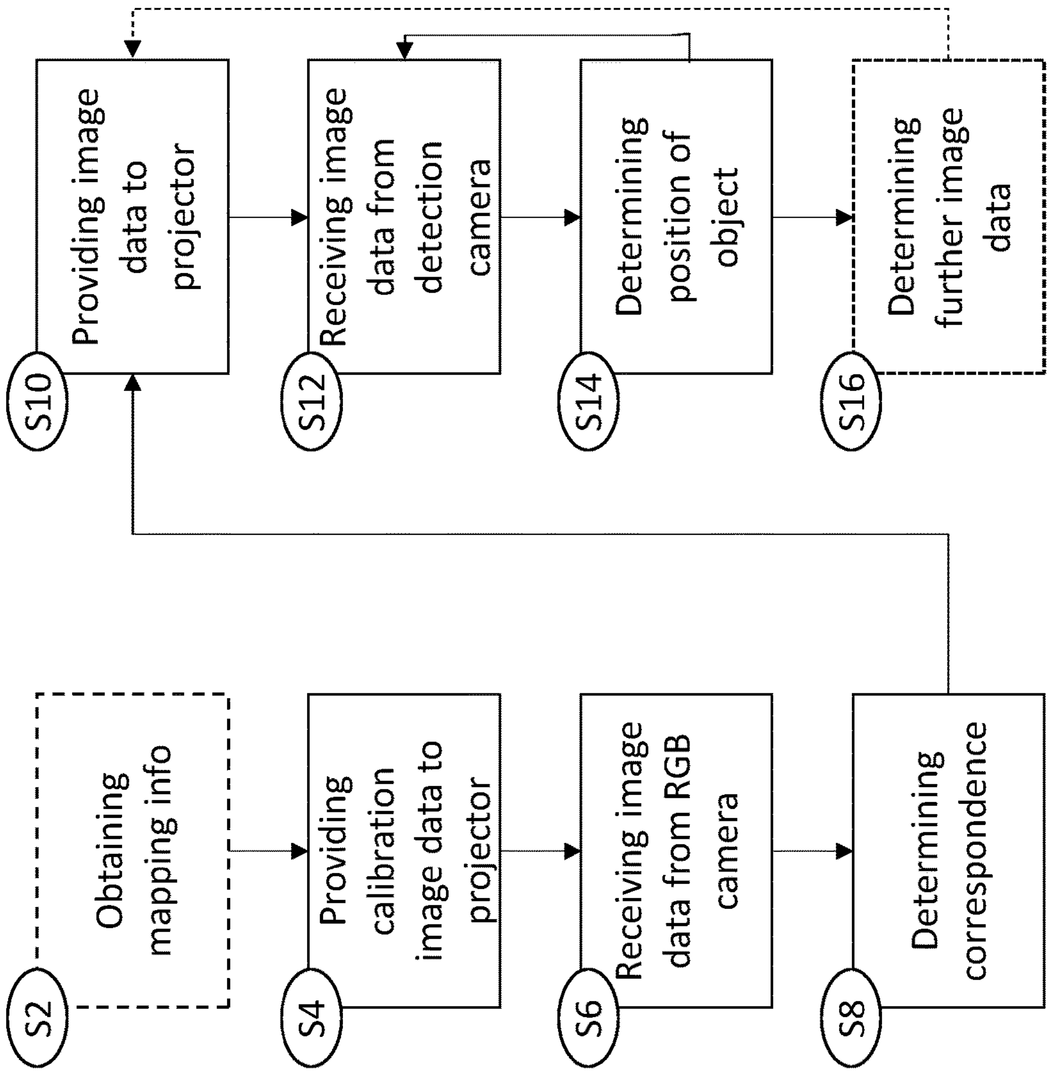
FIG. 2 is a flow chart illustrating a method according to an embodiment.

FIG. 2 illustrates method steps according to an embodiment of the method. It should be appreciated that these method steps can be performed by data processing system 100 of the projector system 100. Steps S2, S4, S6, S8 are typically performed during a calibration procedure. In particular, step S2 involves obtaining mapping information, for example by a user inputting the position and orientation of the surface relative to the projector system into the data processing system. In such case, the data processing system preferably has already stored the intrinsic parameters of the first camera, second camera and projector and their relative positions and orientations with respect to each other. These parameters are for example measured after completion of the fabrication process and subsequently input into the data processing system.

Steps S2, S4, S6, S8 are preferably performed by the projector system 4 every time after it has been brought into a position with respect to a projection surface 10. In an example, the projector system is easily movable from table to table. In such case, the projector system 2 preferably performs steps S2, S4, S6 and S8 for every new setup, thus again at each table.

Figure 4:
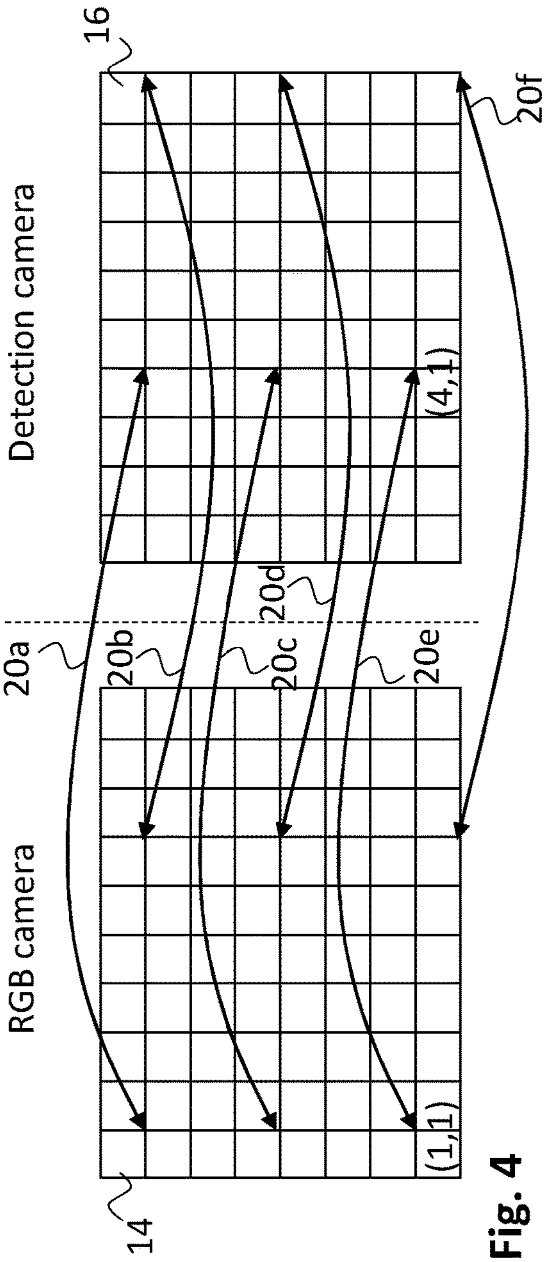
FIG. 4 illustrates the concept of mapping information.

FIG. 4 illustrates an example of mapping information as referred to in this disclosure. The mapping information associates positions within an image as recorded by the second camera (detection camera) to respective positions within an image as recorded by the first camera (RGB camera). FIG. 4 shows the mapping information in the form of arrows 20 which associate positions within the reference frame 14 of the RGB camera to respective positions within reference frame 16 of the detection camera. See for example arrow 20*e*, which associates position (1,1) in reference frame 14 to position (4,1) in reference frame 16.

The mapping information may be embodied as a transformation matrix which transforms any position within an image as recorded by the first camera 6 to a position within an image as recorded by the second camera 8, and/or vice versa.

Figure 3:
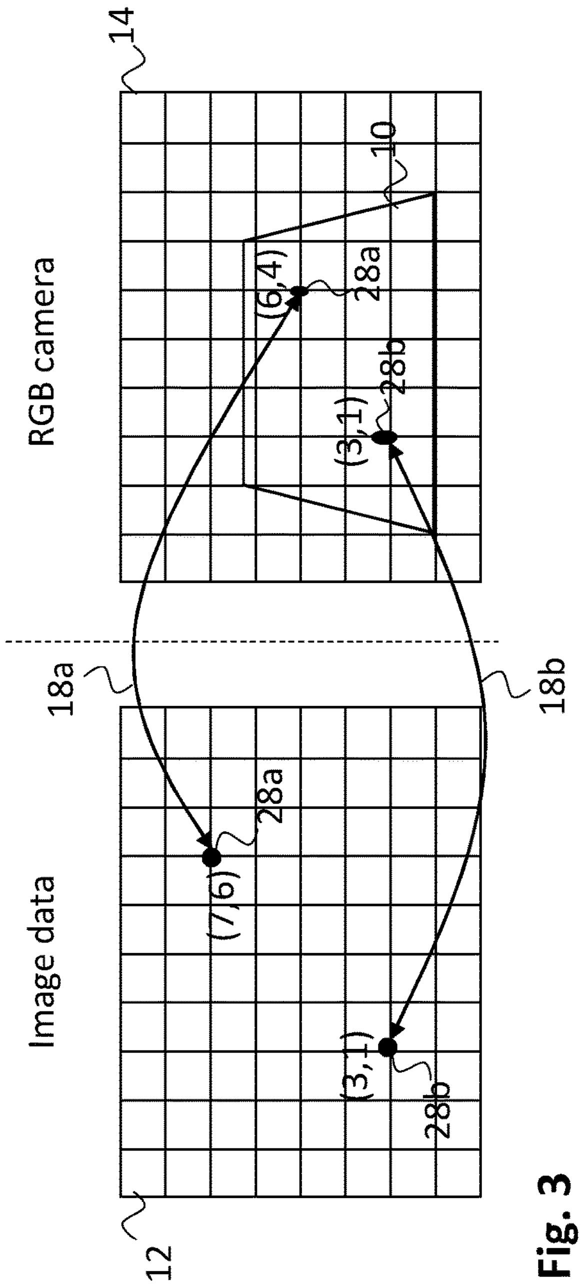
FIG. 3 illustrates the concept of correspondence between positions in the projector reference frame and first camera reference frame, also referred to as calibration data.

Continuing with the method as illustrated in FIG. 2, step S4 illustrates a step of providing calibration image data to the projector 4 and causing the projector to project light on the surface 10 to form a projected version of the first calibration image on the surface. FIG. 3, left hand side, shows an example of a calibration image. In this example, the calibration image is an image of two dots, namely dot 28*a* and dot 28*b*. Dot 28*a* is shown to have a position within the calibration image, and thus in the reference frame 12 of the calibration image, of (7,6), which in this example indicates 7 units of measure to the right of the lower left corner and 6 units of measure above the lower left corner. Dot 28*b* has a position within the calibration image of (3,1). Each of these dots may be understood to be an image feature which can be used for calibration purposes as described herein.

Step S6 (referring again to FIG. 2) involves receiving, from the first camera, image data representing a recorded image of the surface as recorded by the first camera while the first calibration image was being projected on the surface. FIG. 3 right hand side illustrates such recorded image, which was recorded while the calibration image on the left hand side of FIG. 3 was being projected on surface 10. The recorded image shows the surface 10 having projected thereon the calibration image, thus having projected thereon the image feature 28*a* and the image feature 28*b*. Image feature 28*a* is present in the recorded image at a position (6,4) and image feature 28*b* is present in recorded image at position (3,1).

The next step S8 (see FIG. 2) comprises determining that the first image feature in the recorded image corresponds to the first image feature in the calibration image thus determining a correspondence between the first position within the first calibration image and the second position within the recorded image. FIG. 3 illustrates an example of this step (for two image features). Double arrow 18*a* indicates that image feature 28*a* in the recorded image on the right hand side is recognized as images feature 28*a* that is present in the calibration image. Hence, a correspondence between position (6,4) in the recorded image and position (7,6) in the image data is determined. Likewise, arrow 18*b* indicates that image feature 28*b* in the recorded image on the right hand side is recognized as image feature 28*b* that is present in the calibration image on the left hand side. It should be appreciated that such recognition may be performed manually by a person who analyses the recorded image versus the calibration image. However, preferably, such analysis is performed automatically. Known image analysis and recognition techniques may be used for this.

Although FIG. 3 only shows a calibration image having two image features, preferably the calibration image has many image features (that are recognized as such in the recorded image), preferably at least three non-collinear image features, so that many correspondences between positions in the recorded image on one hand and positions in the calibration image can be determined. To illustrate, the calibration image may be an image of a grid, wherein each line crossing in the grid may be treated as an image feature for calibration purposes as described herein. The determined correspondence(s), e.g. the arrows 18 shown in FIG. 3, may be referred to herein as calibration data.

Further, it should be appreciated that although FIG. 3 left hand side shows an example of a calibration image that comprises several image features, it may very well be that multiple calibration images are used, wherein each calibration images comprises its own one or more image features at various positions within the calibration image in question.

Referring back to FIG. 2, steps S10, S12, S14, S16 may be understood to be performed, e.g. by data processing system 100 of the projector system 2, while the projector system 2 is in operation, e.g. while it is projecting a movie on a table with which persons sitting at the table can interact. Step S16 and the return from step S16 to step S10 are optional.

Step S10 comprises providing image data to the projector. The image data represent one or more images. This may be understood to cause the projector to project light on the surface to form a projected version of each of the one or more images on the surface. As explained, herewith, the projector 4 may project a movie on the surface 10.

Figure 5:
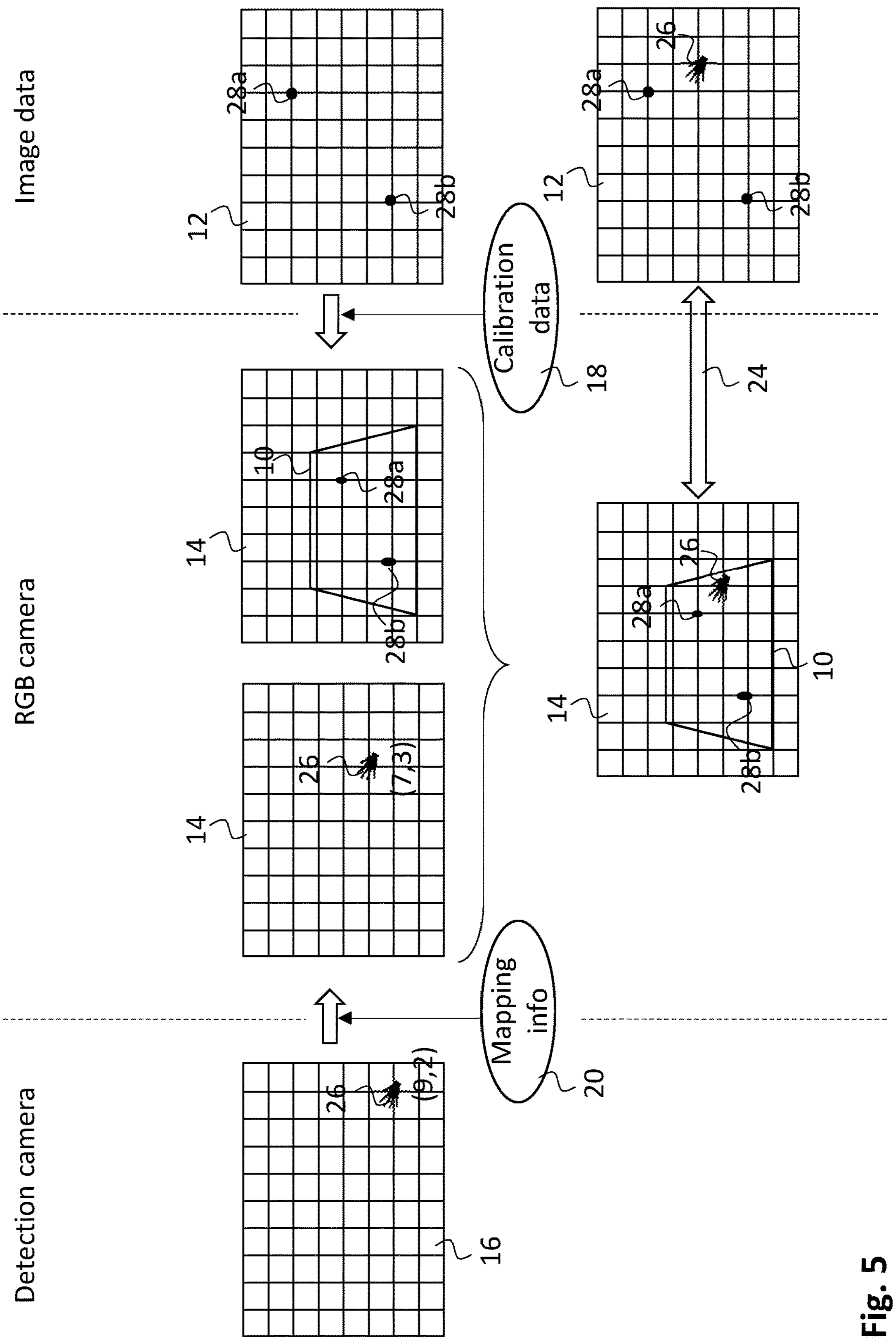
FIG. 5 illustrates how mapping information and calibration data may be used for determining the position of a detected object in the projector reference frame.

Step S12 comprises receiving, from the second camera, detection image data representing a detection image as recorded by the second camera while the one or more images were being projected on the surface. Herein, the recorded detection image has an image of a particular object at a third position within the detection image. FIG. 5 left hand side shows an example of a detection image having an image of a particular object 26, in this case a hand of a person, at position (9,2) within the detection image.

Figure 6:
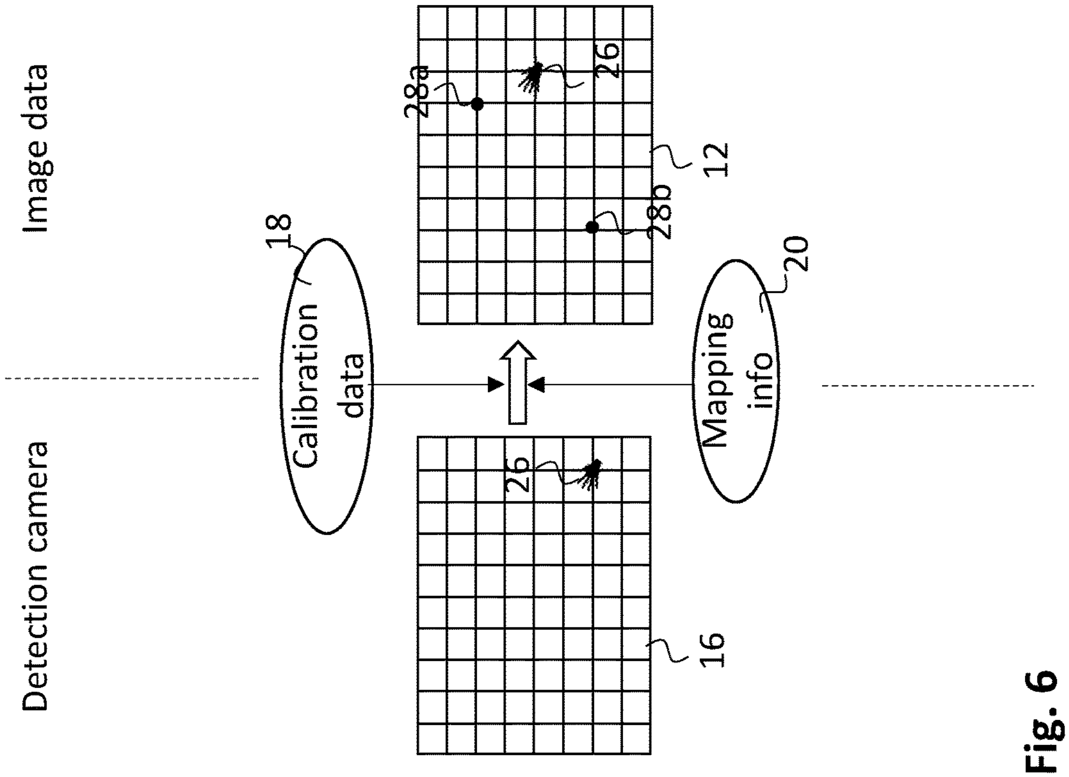
FIG. 6 illustrates how mapping information and calibration data may be used for directly determining the position of a detected object in the projector reference frame.

Step S14 involves, based on the determined correspondence, and based on mapping information, and based on the third position, determining a position of the particular object within the one or more images represented by the image data. FIGS. 5 and 6 illustrate two respective examples of how step S14 may be performed.

FIG. 5 shows on the left hand side a detection image as obtained by a detection camera. The detection image shows an image of a particular object, namely a hand of a person at position (9,2) within the detection image or, in other words, within the reference frame 16 of the detection camera. Then, the data processing system may determine, based on the position (9,2) and based on mapping information 20 as described herein, that the image of the object 26 has a position (7,3) within the reference frame 14 of the RGB camera. The right hand side (top) of FIG. 5 shows an image as represented by image data provided to the projector 4. The image may be any image, however, for clarity reasons the image is again the image of two dots which image may also be used as calibration image as exemplified above. In any case, based on determined correspondences between positions within the images as provided to the projector and positions within recorded images as recorded by the first camera, the position of the dots 28*a* and 28*b* within the reference frame 14 of the first camera can be determined. In FIG. 5, these determined correspondences are indicated by calibration data 18. In this way, both the position of object 26 and the positions of the image features 28*a* and 28*b* are determined in the reference frame 14 of the first camera, meaning that their relative position with respect to each other is also determined as shown in the middle of FIG. 5 (bottom). It should be appreciated that, in this example, as indicated by double arrow 24, the step of determining the position of the particular object 26 within reference frame 14 may be understood as an embodiment of a step of determining the position of the particular object 26 within reference frame 12. Reference frame 14 may namely be regarded as a transformed version of reference frame 12, not least because a link between reference frame 12 and 14 is established and used (for determining the positions of image features such as the dots within reference frame 14).

Similarly, in another example, a step of determining the position of the object within a reference frame of the physical surface (not shown) may be understood as determining the position of the object within reference frame 12 if there is a link established between these reference frames (and used for determining the positions of image features, such as the dots, within the reference frame of the physical surface). Also in such case can the reference frame of the physical surface be regarded as a transformed version of reference frame 12.

FIG. 6 illustrates another example of how step S14 may be performed. In this example, the position of object 26 within reference frame 12 is determined in a more direct manner based on the calibration data 18 and the mapping information 20. In an example, a transformation matrix H is determined based on the calibration data 18 and mapping information 20 that can directly transform positions in reference frame 16 to positions in reference frame 12.

Figure 9:
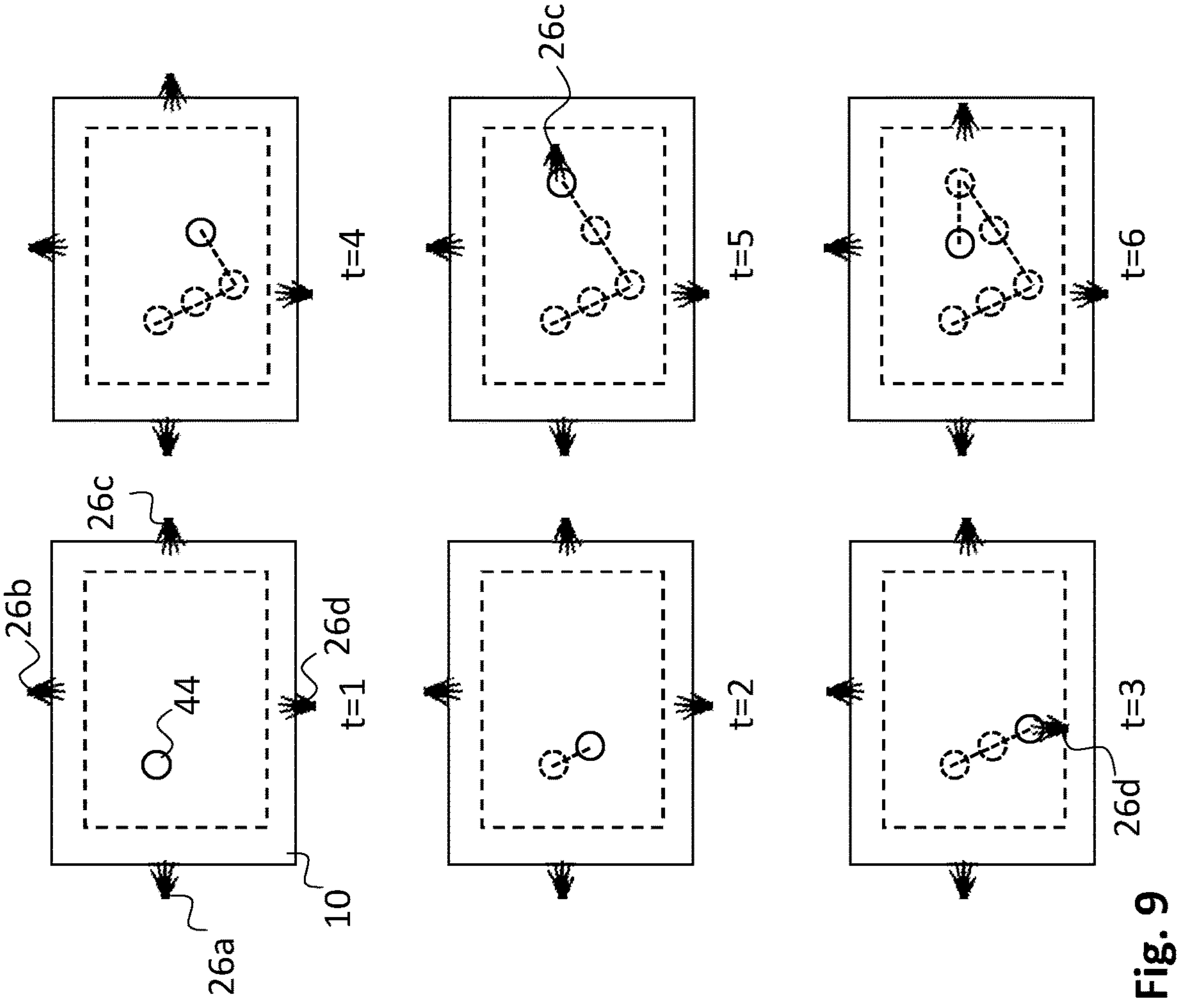
FIG. 9 illustrates the concept of how the determined positions of an object can be used for projecting interactive movies on the surface.

Returning to FIG. 2, step S16 is an optional step of determining further image data representing further one or more images based on the determined position of the particular object within the one or more images represented by the image data. Once determined, this further image data may be provided again to the projector which may cause the projector to project one or more images as represented by the further image data on the surface 10. This for example enable users to interact with a projected movie as illustrated in FIG. 9. FIG. 9 is a top view of a surface 10, in this case a table. Four persons are sitting at the table 10. Of each person one hand 26 is shown. The dashed area of the table is the area in which the projector can project light and thus form one or more images. This setup is shown for six subsequent time instances t=1,2,3,4,5,6. At each time instance a projected version of an image of a ball 44 is formed on the table by the projector 4 projecting appropriate light on the table. As can be seen, the ball is moving at t=1 and t=2 towards hand 26*d*. However, at times t=3, hand 26*d* moves towards the projected version of the image of the ball 4 in order to interact with this image. It should be appreciated that from t=1 to t=3, steps S12 and S14 are repeatedly performed. This allows to monitor the position of the hands 26 continuously. At t=3, hand 26*d* has moved towards the image of the ball 44 and is now at the same position on the table. The data processing system 100 of the projector system 2, upon having determined the position of the hand 26*d* within images as provided to the projector 4, will be able to determine that the image of the ball 44 and the hand 26*d* are at the same position. Based on this, the data processing system 100 can determine further image data, in this example the further image data represent the ball moving into another direction (as can be seen at t=4 and t=5). This can be repeated. Note that at t=5, hand 26*c* has moved to a position in which it "touches" the image 44 of the ball. Again, because the data processing system 100 monitors the position of hand 26*c* within the reference frame of the images as provided to the projector 4, it can determine that indeed at t=5 hand 26 interacts with the image 44 of the ball. Then, even further image data may be determined which may cause the projected version of the ball to move in yet another direction.

It should be appreciated that the data processing system thus preferably repeatedly receives images from the second camera. This allows the data processing system to detect an object in a detection image based on so-called frame differencing techniques. In particular, the data processing system may determine a difference between at least wo detection images out of a plurality of detection images, and determined, based on the determined difference, that the particular object in a recorded detection image sits at some position within the detection image.

Figure 7A:
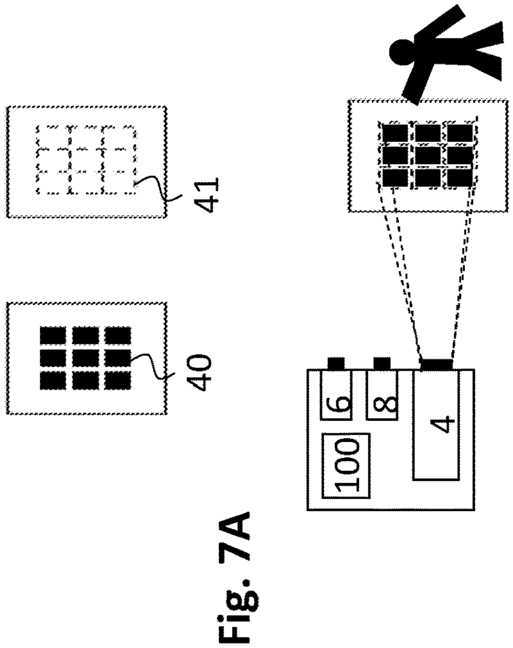
FIGS. 7A and 7B illustrate a method for determining the relevant intrinsic and extrinsic parameters of the first camera, second camera and projector.
Figure 7B:
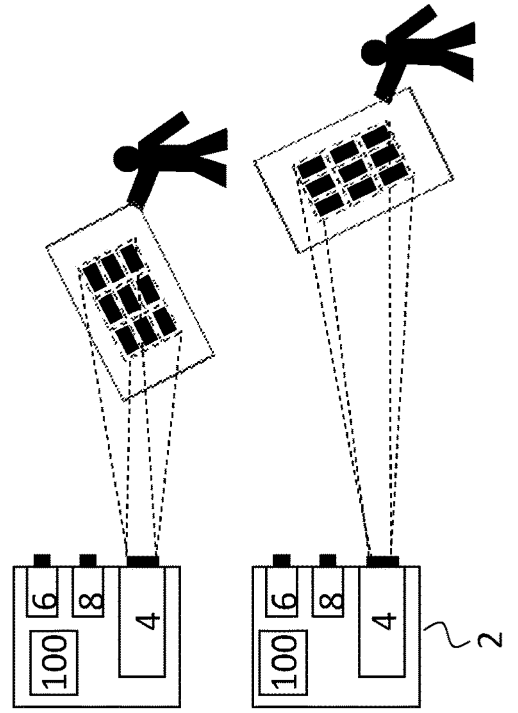

FIGS. 7A and 7B illustrate how samples can be taken for determining the intrinsic parameters of the first 6 and second 8 camera and of the projector 4 and for determining the positions and orientations of the first camera 6, second camera 8 and projector 4 with respect to each other, i.e. the extrinsic parameters of second camera 8 with respect to the first camera 6 and the extrinsic parameters of the projector 4 with respect to the first camera 6.

It is well-known in the field of camera calibration that, for some camera, a position within an image x for any given point in 3D world reference frame is given by the following matrix equation:

$$x = PX,$$

wherein P is the so-called projection matrix and X is a point in the 3D world reference frame. Matrix P is a three-by-four matrix, and can be decomposed into an intrinsic matrix $M_{int}$ indicative of the intrinsic parameters of the camera and an extrinsic matrix $M_{ext}$ indicative of the extrinsic parameters of the camera: $P=M_{int}\,M_{ext}$.

In order to determine the parameters as desired, two calibration patterns may be used, which are schematically shown in FIG. 7A. A physical calibration patterns 40, which is for example some pattern 40 that is printed on a physical piece of paper, and a "virtual" projected calibration pattern 41 which is formed on a surface by light that is being projected by the projector 4. The physical dimensions of the physical pattern are known. Preferably, the virtual calibration pattern is an inverse of the pattern of the physical calibration pattern.

Then, the physical calibration pattern 40 may be positioned in different orientations and positions relative to the projector system. In each pose, the virtual calibration pattern 41 is projected on the physical calibration pattern 41 such that the two do not overlap, as shown in FIG. 7B. In each pose, the first and second camera record an image of the surface with the physical and virtual calibration pattern. The second camera is preferably not sensitive to light from the projector so that the virtual calibration pattern is not visible in images recorded by the second camera.

Based on the images recorded by the first and second camera of the physical calibration pattern in the different poses, and based on the 3D world reference frame positions of the physical calibration pattern in these different poses, can the intrinsic parameters of the first and second camera be determined, like traditional camera calibration.

Then, the intrinsic parameters of the projector can be determined as follows:

1. Given the intrinsic parameters of the first camera and the positions of (image features of) the projected pattern within images as recorded by the first camera, estimate the position and orientation of the projected pattern relative to the first camera.

2. Given the intrinsic parameters of the first camera the positions of (image features of) the projected pattern within images as recorded by the first camera, the position and orientation of the projected pattern relative to the first camera and the assumption that the projected pattern lies in the same 3D surface as the physical pattern, determine the 3D coordinates of the projected pattern in a common coordinate system defined by the physical calibration pattern.

3. Map each pattern coordinate from projector image reference frame to 3D world reference frame. Use these mappings to find the intrinsic parameters for the projector, similar to traditional camera calibration Then, the extrinsic parameters of the second camera with respect to the first camera and the extrinsic parameters of the projector with respect to the first camera can be determined as follows:

1. Given the positions of (image features of) the physical pattern in images as recorded by the first and second camera, the known 3D coordinates of the physical pattern and the intrinsic parameters of the first and second camera, find the extrinsic parameters of the second camera with respect to the first camera, similarly to traditional stereo calibration 2. Given the positions of (image features of) the virtual pattern in images as recorded by the first camera and in images provide to the projector, the estimated 3D coordinates of the virtual pattern and the intrinsic parameters of the first camera and the projector, find the extrinsic parameters the projector of the projector with respect to the first camera similarly to traditional stereo calibration FIG. 8 illustrates an embodiment wherein the mapping information is determined by determining a position and orientation of the surface relative to the first and/or second camera, wherein the position and orientation of the surface is determined based on the calibration image that is projected on the surface.

Steps S4, S6, S8, S10-S16 have been described with reference to FIG. 2.

Figure 8:
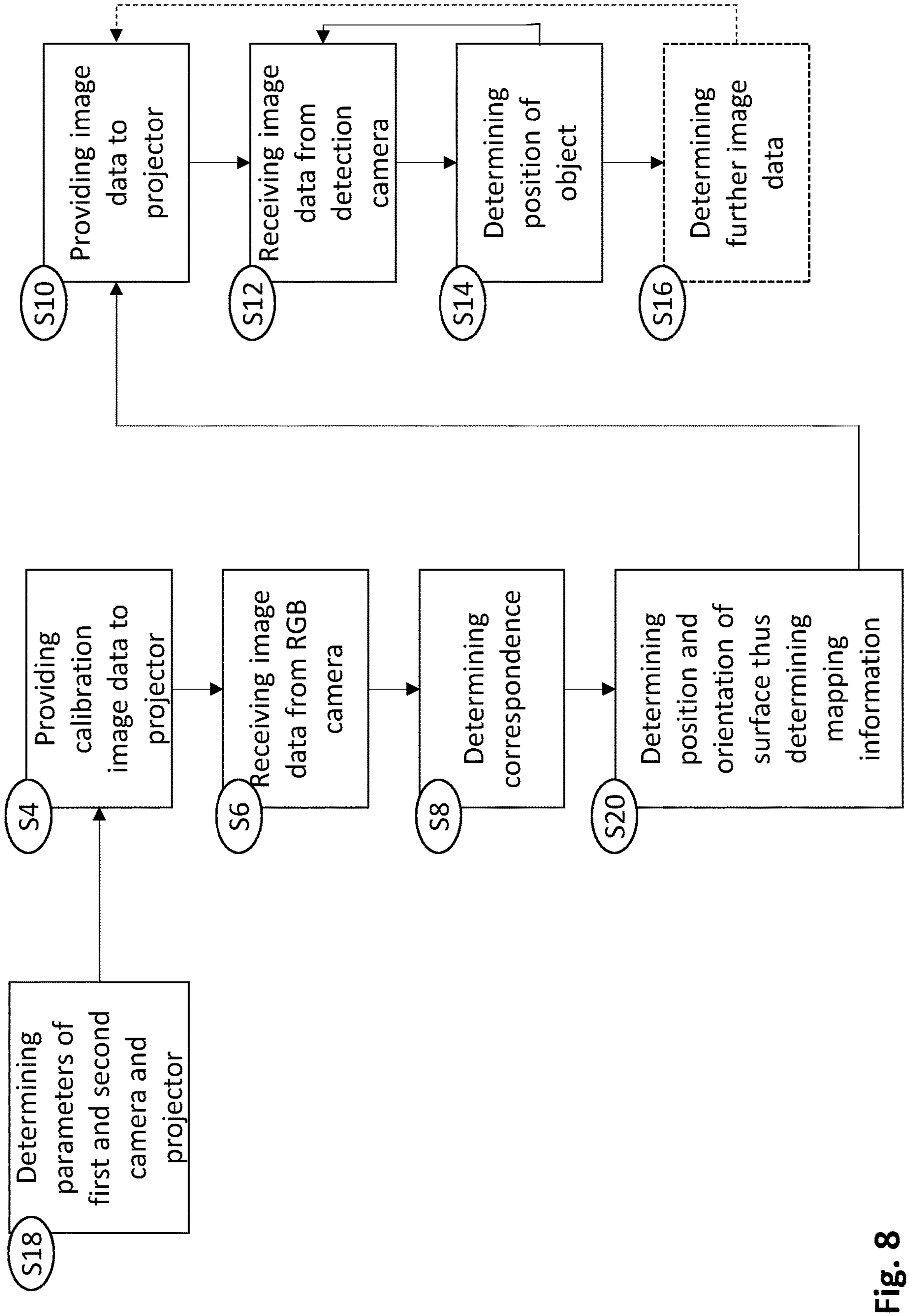
FIG. 8 is a flow chart illustrating an embodiment wherein the mapping information is determined by determining the position and orientation of the surface relative to the first camera.

The embodiment of FIG. 8 comprises a step S18 of determining the intrinsic parameters of the first camera, second camera and projector as well as their relative positions and orientations relative to each other. This can be performed in accordance with the method described with reference to FIG. 7B. These parameters can be determined once, for example in the factory after fabrication of the projector system, because these parameters in principle do not change during the lifecycle of the projector system.

The other steps may be performed every time that the projector system is set up in a new configuration, e.g. at a new table, wherein steps S4, S6, S8 and S20 may be understood to be part of an automatic calibration procedure and steps S10, S12, S14 and S16 are performed by the projector system in use.

In this embodiment, the calibration image preferably comprises at least three image features so that the data processing system can, in step S20, determine the position and orientation of the surface using triangulation as explained above using correspondences between at least three image features as present in the projector reference frame and three image feature in the first camera reference frame. Herewith the position and orientation of the surface relative to the first camera and relative to the second camera and relative to the projector is determined (if the positions and orientations of the first camera, second camera and projector relative to each other are known). The position and orientation of the surface relative to the first and second camera and parameters determined in step S18 associate positions within the first camera reference frame to positions within the second camera reference frame and may thus be understood as mapping information referred to herein.

The data processing system can, based on the position and orientation of the surface and based on the parameters obtained in step S18, determine how to map positions within images provided to the projector to positions within images as recorded by the second camera or, in other words, how to map positions in the second camera reference frame to positions in the projector reference frame.

Figure 10A:
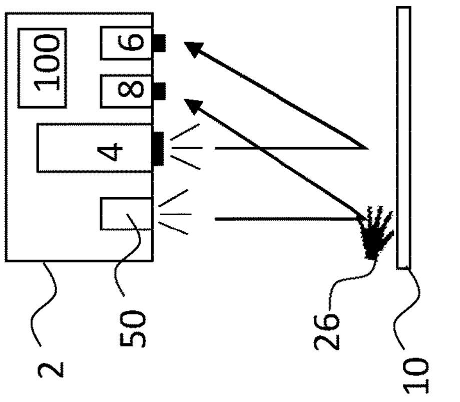
FIG. 10A illustrates an embodiment of the projector system comprising a detection light source.

FIG. 10A illustrates an embodiment of the system 2 wherein the system comprises a detection light source 50 for emitting detection light towards the surface, such that the detection light reflects from the particular object 26 onto the second camera 8. Note that the projector 4 emits light to the surface 10, which light is reflected from the surface towards the first camera 6. Of course, the light emitted by source 50 will likely be incident on the first camera 6 and the light from projector 4 will be incident on the second camera 8 as well. However, by using appropriate filters, it can be prevented that light from source 50 distorts images as recorded by the first camera 6 and it can be prevented that light from projector 4 distorts images as recorded by the second camera 8.

Figure 10B:
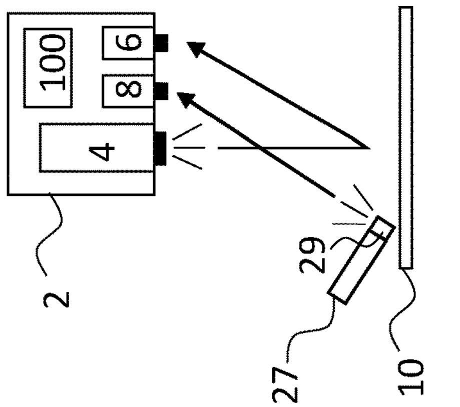
FIG. 10B illustrates an embodiment wherein the object comprises a detection light source.

FIG. 10B illustrates an embodiment of the system 2 that does not comprise a detection light source. In this embodiment, an object 27 has a light source 29 configured to autonomously emit detection light towards the second camera 1.

Figure 11A:
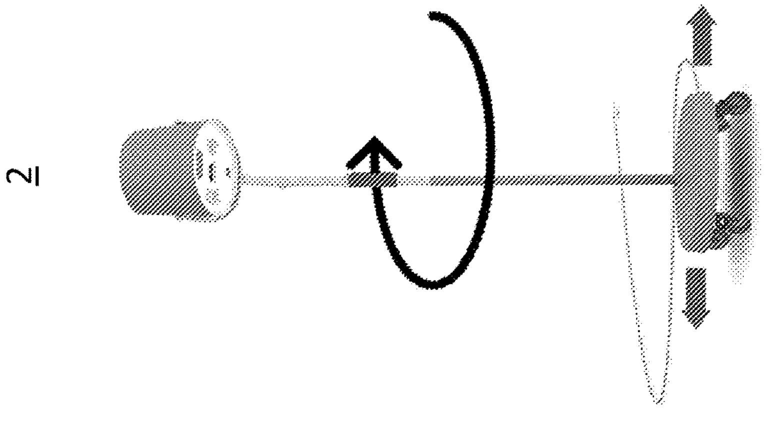
FIGS. 11A and 11B are three-dimensional drawings of the projector system according to an embodiment.
Figure 11B:
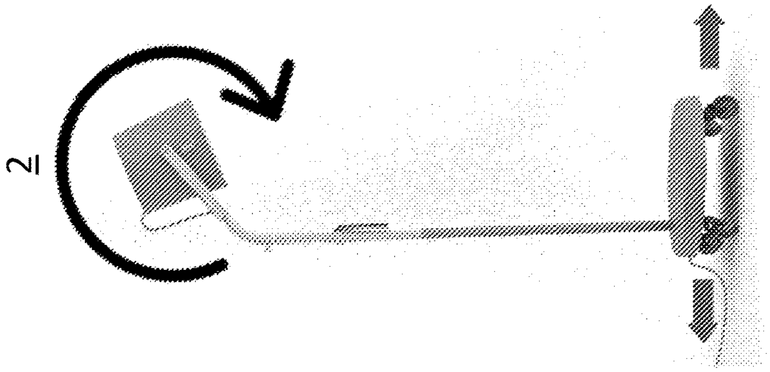

FIG. 11 shows a three-dimensional figure of the projector system 2 according to an embodiment. As shown, this projector system 2 comprises a base 60 having wheels underneath so that the system can be easily moved from table to table. The system as a whole can rotate around a vertical axis as shown by turning the base as shown in FIG. 11A. Further, the head of the projector system 2, having embodied therein the first camera, second camera and projector can be rotated around a horizontal axis is indicated in FIG. 11B.

Figure 12:
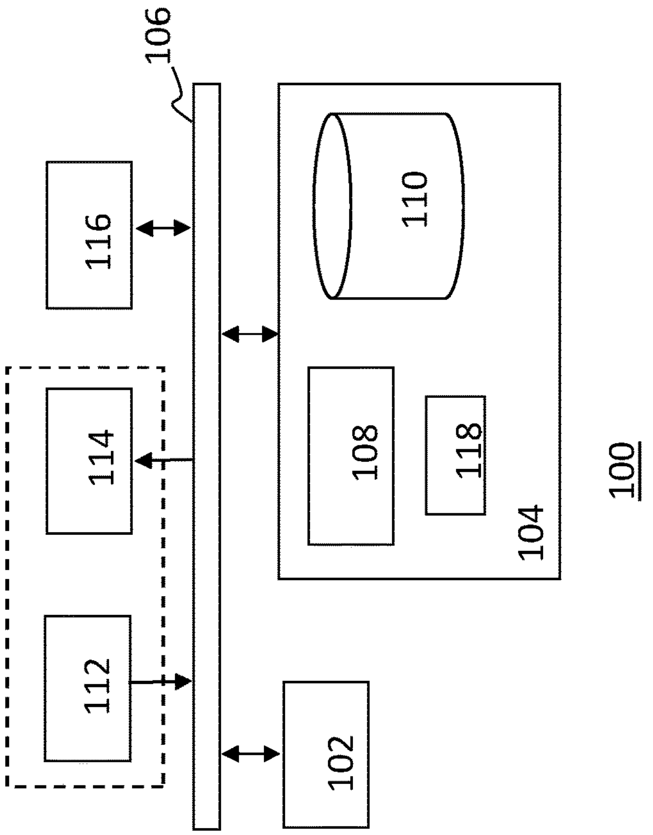
FIG. 12 illustrates a data processing system according to an embodiment.

FIG. 12 depicts a block diagram illustrating a data processing system according to an embodiment.

As shown in FIG. 12, the data processing system 100 may include at least one processor 102 coupled to memory elements 104 through a system bus 106. As such, the data processing system may store program code within memory elements 104. Further, the processor 102 may execute the program code accessed from the memory elements 104 via a system bus 106. In one aspect, the data processing system may be implemented as a computer that is suitable for storing and/or executing program code. It should be appreciated, however, that the data processing system 100 may be implemented in the form of any system including a processor and a memory that is capable of performing the functions described within this specification.

The memory elements 104 may include one or more physical memory devices such as, for example, local memory 108 and one or more bulk storage devices 110. The local memory may refer to random access memory or other non-persistent memory device(s) generally used during actual execution of the program code. A bulk storage device may be implemented as a hard drive or other persistent data storage device. The processing system 100 may also include one or more cache memories (not shown) that provide temporary storage of at least some program code in order to reduce the number of times program code must be retrieved from the bulk storage device 110 during execution.

Input/output (I/O) devices depicted as an input device 112 and an output device 114 optionally can be coupled to the data processing system. Examples of input devices may include, but are not limited to, a keyboard, a pointing device such as a mouse, a touch-sensitive display, a first camera described herein, a second camera described herein, a projector 4 described herein, a detection light source described herein, or the like. Examples of output devices may include, but are not limited to, a monitor or a display, speakers, a first camera described herein, a second camera described herein, a projector 4 described herein, a detection light source described herein, or the like. Input and/or output devices may be coupled to the data processing system either directly or through intervening I/O controllers.

In an embodiment, the input and the output devices may be implemented as a combined input/output device (illustrated in FIG. 12 with a dashed line surrounding the input device 112 and the output device 114). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 116 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 100, and a data transmitter for transmitting data from the data processing system 100 to said systems, devices and/or networks. Modems, cable modems, and Ethernet cards are examples of different types of network adapter that may be used with the data processing system 100.

As pictured in FIG. 12, the memory elements 104 may store an application 118. In various embodiments, the application 118 may be stored in the local memory 108, the one or more bulk storage devices 110, or apart from the local memory and the bulk storage devices. It should be appreciated that the data processing system 100 may further execute an operating system (not shown in FIG. 12) that can facilitate execution of the application 118. The application 118, being implemented in the form of executable program code, can be executed by the data processing system 100, e.g., by the processor 102. Responsive to executing the application, the data processing system 100 may be configured to perform one or more operations or method steps described herein.

In another aspect, the data processing system 100 may represent a client data processing system. In that case, the application 118 may represent a client application that, when executed, configures the data processing system 100 to perform the various functions described herein with reference to a "client". Examples of a client can include, but are not limited to, a personal computer, a portable computer, a mobile phone, or the like.

In yet another aspect, the data processing system 100 may represent a server. For example, the data processing system may represent an (HTTP) server, in which case the application 118, when executed, may configure the data processing system to perform (HTTP) server operations.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 102 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. A projector system comprising:

a projector for projecting light on a surface, wherein the projected light is configured to form one or more images on the surface;

a first camera for recording an image of the surface, the first camera being sensitive to projected light that has reflected from the surface;

a second camera for recording images of the surface, the second camera being sensitive to detection light from an object near and/or on the surface and/or between the surface and the second camera, the second camera being insensitive to the projected light;

wherein the projector, the first camera, the second camera are arranged in known positions relative to each other, the second camera being arranged at a certain distance from the first camera; and a data processing system configured to perform steps of:

in a preparatory stage:

determining or receiving mapping information, the mapping information comprising a first transformation matrix, and the mapping information associating positions within an image as recorded by the second camera to respective positions within an image as recorded by the first camera, based on the relative positions of the projector, the first camera and the second camera and based on intrinsic parameters of the first camera and of the second camera;

in a calibration stage:

providing calibration image data to the projector, the calibration image data representing one or more first calibration images having a first image feature at a first position within the one or more first calibration images, and causing the projector to project light on the surface to form a projected version of the one or more first calibration images on the surface;

receiving, from the first camera, image data representing one or more recorded images of the surface as recorded by the first camera while the one or more first calibration images were being projected on the surface, wherein the first image feature is present in the one or more recorded images at second positions within the one or more recorded images;

determining that the first image feature in the one or more recorded images corresponds to the first image feature in the one or more first calibration images, thus determining a first correspondence between the first positions within the one or more first calibration images and the second positions within the one or more recorded images; and estimating a second transformation matrix based on the determined first correspondence, the second transformation matrix defining a linear transformation between a projector space and a first camera space;

and in a working stage:

providing image data to the projector, the image data representing one or more images, and causing the projector to project light on the surface to form a projected version of each of the one or more images on the surface;

receiving, from the second camera, detection image data representing a recorded detection image as recorded by the second camera while the one or more images were being projected on the surface, the recorded detection image having an image of a particular object at a third position within the recorded detection image; and determining a position of the particular object within the one or more images represented by the image data, based on a product of the first and second transformation matrices, and said third position.

2. The projector system according to claim 1, wherein the one or more first calibration images have a second image feature at a fourth position within the one or more first calibration images different from the first positions, and wherein the second image feature is present in the one or more recorded images at a fifth position within the one or more recorded images, and wherein the data processing system is configured to perform steps of:

in the calibration stage, determining that the second image feature in the one or more recorded images corresponds to the second image feature in the one or more first calibration images thus determining a second correspondence between the fourth position within the one or more first calibration images and the fifth position within the one or more recorded images, and in the working stage, determining the position of the particular object within the one or more images represented by the image data based on the determined correspondence, the determined second correspondence, the third position, and the mapping information.

3. The projector system according to claim 1, wherein the calibration image data represent a second calibration image having a second image feature at a fourth position within the second calibration image, different from the first positions within the one or more first calibration images, wherein the data processing system is configured to perform steps of:

in the calibration stage:

causing the projector to project light on the surface to form a projected version of the second calibration image on the surface;

receiving, from the first camera, second image data representing a second recorded image of the surface as recorded by the first camera while the second calibration image was being projected on the surface, wherein the second image feature is present in the second recorded image at a fifth position within the second recorded image;

determining that the second image feature in the second recorded image corresponds to the second image feature in the second calibration image thus determining a second correspondence between the fourth position within the second calibration image and the fifth position within the second recorded image; and in the working stage:

determining the position of the particular object within the one or more images represented by the image data based on the determined first correspondence, the determined second correspondence and the mapping information.

4. The projector system according to claim 1, wherein the data processing system is further configured to perform steps of:

based on the determined position of the particular object within the one or more images represented by the image data, determining further image data representing further one or more images; and providing the further image data to the projector and causing the projector to project light on the surface to form a projected version of each of the one or more further images.

5. The projector system according to claim 1, wherein the step of determining the mapping information comprises measuring a position and orientation of the surface relative to the first and second camera.

6. The projector system according to claim 1, wherein the step of determining the position and orientation of the surface relative to the first and/or second camera is performed based on the determined first correspondence.

7. The projector system according to claim 1, wherein the detection image data represent a plurality of detection images as recorded by the second camera, wherein the data processing system is configured to perform steps of:

determining a difference between at least two detection images out of the plurality of detection images; and based on the determined difference, determining that the particular object in the recorded detection image sits at the third position within the recorded detection image.

8. The projector system according to claim 1, wherein the first camera comprises a first imaging plane for receiving the projected light that has reflected from the surface for recording images of the surface, the second camera comprises a second imaging plane for receiving the detection light for recording images of the surface, wherein the first imaging plane and second imaging plane are non-overlapping.

9. The projector system according to claim 1, further comprising a detection light source for emitting light towards the surface, such that the detection light reflects from the particular object onto the second camera.

10. A method for projecting one or more images on a surface using a projector system, wherein the projector system comprises:

a projector for projecting light on a surface, wherein the projected light is configured to form one or more images on the surface;

a first camera for recording an image of the surface, the first camera being sensitive to projected light that has reflected from the surface; and a second camera for recording images of the surface, the second camera being sensitive to detection light from an object near and/or on the surface and/or between the surface and the second camera, such as a hand on the surface, the second camera being insensitive to the projected light;

wherein the projector, the first camera, and the second camera are arranged in known positions relative to each other, the second camera being arranged at a certain distance from the first camera;

the method comprising:

in a preparatory stage:

determining or receiving mapping information, the mapping information comprising a first transformation matrix, and the mapping information associating positions within an image as recorded by the second camera to respective positions within an image as recorded by the first camera, based on the relative positions of the projector, the first camera and the second camera and based on intrinsic parameters of the first camera and of the second camera;

in a calibration stage:

providing calibration image data to the projector, the calibration image data representing one or more first calibration images having a first image feature at a first position within the calibration image, and causing the projector to project light on the surface to form a projected version of the one or more first calibration images on the surface;

receiving, from the first camera, image data representing one or more recorded images of the surface as recorded by the first camera while the one or more first calibration images was being projected on the surface, wherein the first image feature is present in the one or more recorded images at a second position within the one or more recorded images;

determining that the first image feature in the one or more recorded images corresponds to the first image feature in the one or more calibration images thus determining a first correspondence between the first positions within the one or more first calibration images and the second position within the one or more recorded images; and estimating a second transformation matrix based on the determined first correspondence, the second transformation matrix defining a linear transformation between a projector space and a first camera space;

and in an operation stage:

providing image data to the projector, the image data representing one or more images, and causing the projector to project light on the surface to form a projected version of each of the one or more images on the surface;

receiving, from the second camera, detection image data representing a recorded detection image as recorded by the second camera while the one or more images were being projected on the surface, the recorded detection image having an image of a particular object at a third position within the recorded detection image, and determining a position of the particular object within the one or more images represented by the image data, based on a product of the first and second transformation matrices, and the third position.

11. The method according to claim 10, further comprising, in the operation stage:

based on the determined position of the particular object within the one or more images represented by the image data, determining further image data representing further one or more images; and providing the further image data to the projector and causing the projector to project light on the surface to form a projected version of each of the one or more further images.

12. The method according to claim 10, wherein the detection image data represent a plurality of detection images as recorded by the second camera, the method further comprising determining a difference between at least wo detection images out of the plurality of detection images; and based on the determined difference, determining that the particular object in the recorded detection image sits at the third position within the recorded detection image.

13. A data processing system that is configured to perform the method according to claim 10.

14. A non-transitory computer-readable data carrier having stored thereon a computer program comprising instructions which, when the program is executed by a computer, cause the computer to carry out the method according to claim 10.

* * * * *